Feb. 18, 1936. F. RÜSBERG 2,031,180
MAKING WATER SOLUBLE BARIUM SALTS AND HYDROGEN PEROXIDE
Filed April 13, 1933
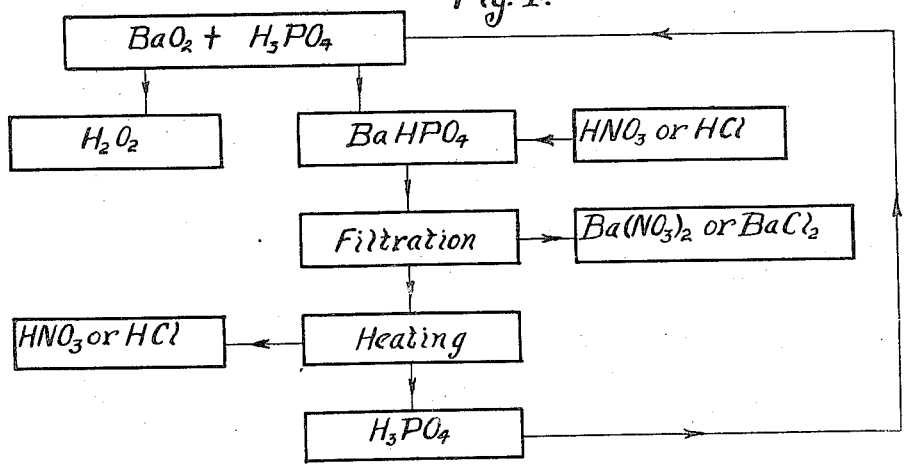
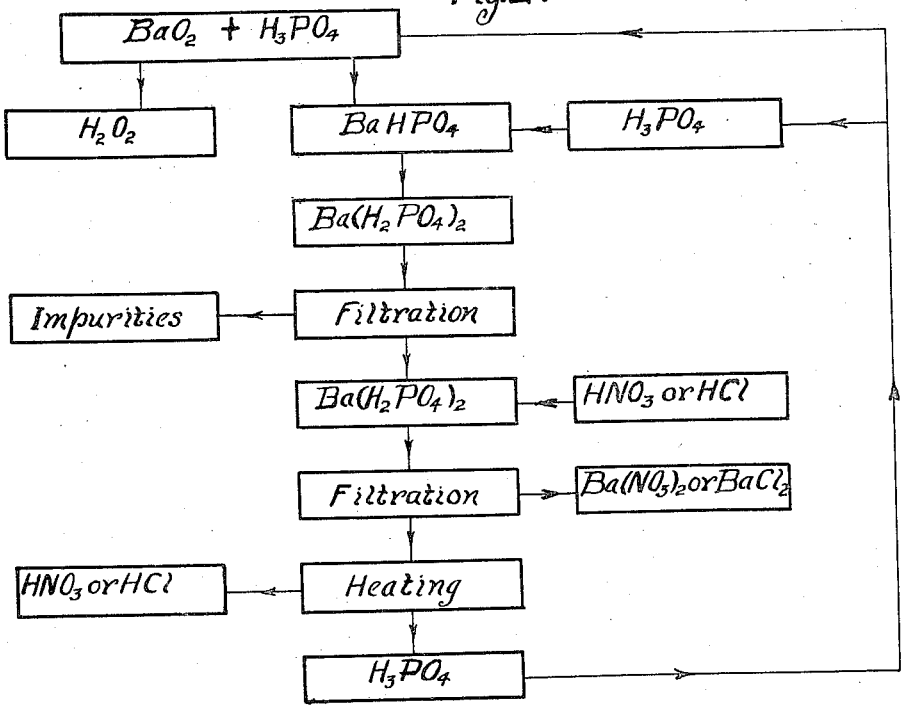
Inventor
Friedrich Rüsberg
Attorneys Patented Feb. 18, 1936

2,031,180

UNITED STATES PATENT OFFICE 2,031,180

MAKING WATER SOLUBLE BARIUM SALTS AND HYDROGEN PEROXIDE

Friedrich Rüsberg, Berlin - Niederschoneweide, Germany, assignor to Kali-Chemie Aktiengesellschaft, Berlin, Germany Application April 13, 1933, Serial No. 666,061
In Germany May 7, 1932

5 Claims. (Cl. 23—207)

This invention relates to the manufacture of hydrogen peroxide by decomposition of barium peroxide with phosphoric acid and has for its main object the recovery of the phosphoric acid from the solid dibarium phosphate formed by the decomposition of the barium peroxide.

A further object of the invention is the manufacture of water soluble barium salts and hydrogen peroxide from barium peroxide.

Still a further object of the invention is the provision of a method for making hydrogen peroxide by decomposition of barium peroxide with phosphoric acid, in which the latter acid is employed in a cycle.

It is known in the art of making hydrogen peroxide to decompose barium peroxide with aqueous phosphoric acid, in order to obtain an aqueous solution of hydrogen peroxide and solid dibarium phosphate. The hydrogen peroxide solution may easily be separated from the dibarium phosphate, which until now was a comparatively valueless by-product of this process. The substitution in this process of the phosphoric acid by hydrochloric acid, in order to obtain the valuable barium chloride as by-product is not possible, as hydrogen peroxide combines with barium chloride under formation of a salt containing hydrogen peroxide in the same manner as crystal water.

According to the invention the dibarium phosphate, obtained by decomposition of barium peroxide with aqueous phosphoric acid, is treated with an acid capable of forming water soluble barium salts, such as hydrochloric or nitric acid, in order to decompose it under formation of a water soluble barium salt and phosphoric acid. This water soluble barium salt is practically completely separated from the phosphoric acid which may be used for decomposing fresh barium peroxide or for the manufacture of alkali metal or other phosphates, which have more commercial value, than barium phosphate.

The accompanying drawing illustrates, in the form of flow sheets, the sequence of steps employed. Figure 1 illustrates the sequence of steps generally employed and Figure 2 illustrates a modification thereof.

Examples (1) Barium peroxide is decomposed with aqueous phosphoric acid. The aqueous hydrogen peroxide is separated from the solid dibarium phosphate formed. 6.6 kg. of this moist dibarium phosphate are gradually introduced into and dissolved in 8 liters of a 20% hydrochloric acid. Some barium chloride precipitates. In order to complete the precipitation of the barium chloride 2.5 liters of a 37% hydrochloric acid are added. The precipitated barium chloride is separated from the liquid by filtration, washed with a 20% hydrochloric acid and purified by recrystallization.

The aqueous liquid, containing 10.7% of HCl; 18.1% of $H_3PO_4$ and 1.6% of BaO is heated, until the vapors going off are free from hydrochloric acid. The phosphoric acid obtained, which is free from hydrochloric acid, is used for the decomposition of fresh barium peroxide.

(2) 3.3 kg. of the same moist dibarium phosphate as in Example 1 are gradually introduced into and dissolved in 4 liters of a 30% nitric acid. The solution is cooled and the precipitated barium nitrate is separated from the liquid. 2.8 kg. of barium nitrate and 3.4 liters of a liquid containing 24% of $H_3PO_4$; 2.2% of $HNO_3$ and 1.8% of BaO are obtained. Some sodium carbonate is added to the liquid. The precipitated barium phosphate is separated from the mother liquid, which is then neutralized with sodium carbonate. By cooling the solution to a temperature of 2° C. about 2.5 kg. of disodium phosphate are precipitated, which are separated from the mother liquor.

(3) 17.5 kg. of the same moist dibarium phosphate as in Example 1 with about 20% of moisture are dissolved in 50 liters of a 33% phosphoric acid. The residue is separated from the solution of monobarium phosphate obtained and the latter decomposed by introduction of gaseous hydrochloric acid. The solution is cooled to about 5° C. below zero and the precipitated barium chloride is separated from the solution, which contains 37.5% of $H_3PO_4$; 5.1% of HCl and 0.36% of BaO and is worked up in the same manner as described in Example 1.

(4) 9.5 liters of a 63% nitric acid are gradually added to the monobarium phosphate solution obtained according to Example 3. The temperature is kept between 50 and 60° C. by heating. The liquid is then cooled to about 5° C. below zero and the precipitated barium nitrate is separated from the mother liquid, which contains 36.4% of $H_3PO_4$; 3.4% of $HNO_3$ and 0.086% BaO. This impure phosphoric acid is heated to drive off the nitric acid present and then used for decomposing fresh barium peroxide.

The foregoing detailed examples have been given for clearness of understanding only, and no unnecessary limitations should be understood therefrom, but the appended claims should be construed as broadly as permissible in view of the prior art.

I claim:

1. A method for making water soluble barium salts and hydrogen peroxide which consists in decomposing barium peroxide with aqueous phosphoric acid, separating the aqueous hydrogen peroxide from the solid dibarium phosphate formed, dissolving said dibarium phosphate in phosphoric acid, separating the undissolved from the solution of monobarium phosphate obtained, decomposing said monobarium phosphate solution with a volatile acid capable of forming a water soluble barium salt in an amount sufficient to convert substantially all the dibarium phosphate into such barium salt and phosphoric acid, separating the phosphoric acid from the barium salt, both formed by said decomposition, removing the volatile acid present in said phosphoric acid by heating and decomposing fresh barium peroxide with said phosphoric acid.

2. A method for making water soluble barium salts and hydrogen peroxide which consists in decomposing barium peroxide with aqueous phosphoric acid, separating the aqueous hydrogen peroxide from the solid dibarium phosphate formed, dissolving said dibarium phosphate in phosphoric acid, separating the undissolved from the solution of monobarium phosphate obtained, decomposing said monobarium phosphate solution with hydrochloric acid in an amount sufficient to convert substantially all the dibarium phosphate into barium chloride and phosphoric acid, separating the phosphoric acid from the barium chloride, both formed by said decomposition, removing the hydrochloric acid present in said phosphoric acid by heating and decomposing fresh barium peroxide with said phosphoric acid.

3. A method for making water soluble barium salts and hydrogen peroxide which consists in decomposing barium peroxide with aqueous phosphoric acid, separating the aqueous hydrogen peroxide from the solid dibarium phosphate formed, dissolving said dibarium phosphate in phosphoric acid, separating the undissolved from the solution of monobarium phosphate obtained, decomposing said monobarium phosphate solution with nitric acid in an amount sufficient to convert substantially all the dibarium phosphate into barium nitrate and phosphoric acid, separating the phosphoric acid from the barium nitrate, both formed by said decomposition, removing the nitric acid present in said phosphoric acid by heating and decomposing fresh barium peroxide with said phosphoric acid.

4. The method of claim 2 in which gaseous hydrochloric acid is used for decomposing the mono-barium phosphate and the barium chloride is separated out at a temperature below 0° C.

5. The method of claim 3 in which the barium nitrate is separated out at a temperature below 0° C.

FRIEDRICH RÜSBERG.